United States Patent
Ohyama

(10) Patent No.: US 6,366,548 B1
(45) Date of Patent: Apr. 2, 2002

(54) OPTICAL PICKUP HAVING TWO LASER BEAM SOURCES HAVING WAVE LENGTHS DIFFERENT FROM EACH OTHER AND OPTICAL DEVICE INCLUDING THE OPTICAL PICKUP

(75) Inventor: Minoru Ohyama, Kanagawa-ken (JP)

(73) Assignee: Victor Company Of Japan, Yokahama (JP)

(*) Notice: Subject to any disclaimer, the term of this patent is extended or adjusted under 35 U.S.C. 154(b) by 0 days.

(21) Appl. No.: 09/420,189

(22) Filed: Oct. 18, 1999

(30) Foreign Application Priority Data

Oct. 19, 1998 (JP) .............................. 10-297400

(51) Int. Cl.$^7$ ................................ G11B 7/00
(52) U.S. Cl. ........................ 369/112.04; 369/112.05; 369/112.17; 369/121
(58) Field of Search ............... 369/112.03, 112.04, 369/112.05, 112.06, 112.07, 112.12, 112.17, 112.18, 112.19, 121, 122, 112.16, 112.27

(56) References Cited

U.S. PATENT DOCUMENTS

| | | | |
|---|---|---|---|
| 5,703,856 A | 12/1997 | Hayashi et al. | |
| 6,130,872 A | * 10/2000 | Sugiura et al. | 369/112.15 X |
| 6,185,176 B1 | * 2/2001 | Sugiura et al. | 369/44.12 X |
| 6,195,315 B1 | * 2/2001 | Takahashi et al. | 369/44.23 |

FOREIGN PATENT DOCUMENTS

| | | | |
|---|---|---|---|
| EP | 0 747893 A2 | 12/1996 | |
| EP | 0 844605 A2 | 5/1998 | |
| EP | 0 860819 A2 | 8/1998 | |
| JP | 09097448 | 8/1997 | |
| JP | 10021577 | 1/1998 | |
| JP | 10049904 | 2/1998 | |

OTHER PUBLICATIONS

Yamada et al., DVD/CD/CD–R Pick–Up with Two–Wavelength Two–Beam Laser, IEEE Transactions on Consumer Electronics, vol. 44, No.3, Aug. 1998, pp. 591–600.

National Technical Report vol. 43, No. 3, Jun. 1997, pp. 55–62.

Hsi–Fu Shih et al., "Holographic Laser Module with Dual Wavelength for DVD Optical Heads", International Symposium on Optical Memory 1998, Technical Digest pp. 22–23 (Oct. 1998).

* cited by examiner

Primary Examiner—Paul W. Huber
(74) Attorney, Agent, or Firm—Nath & Associates PLLC; Gary M. Nath; Marvin C. Berkowitz

(57) ABSTRACT

An optical pickup of this invention includes a first laser beam source having a wave length of 780 nm and a second laser beam source having a second wave length of 650 nm wherein the first laser beam source and the second laser beam source are disposed in the vicinity of each other, emission lights from the first laser beam source and the second laser beam source are emitted along substantially the same optical axis and a reflected light from the information recording medium is returned along the optical axis; the first diffraction grating, the second diffraction grating and the light receiving device substrate are disposed in order, the first diffraction grating is substantially transparent for a wave length of 780 nm and diffracts a wave length of 650 nm, and the second diffraction grating is substantially transparent for a wave length of 650 nm while it diffracts a wave length of 780 nm.

6 Claims, 9 Drawing Sheets

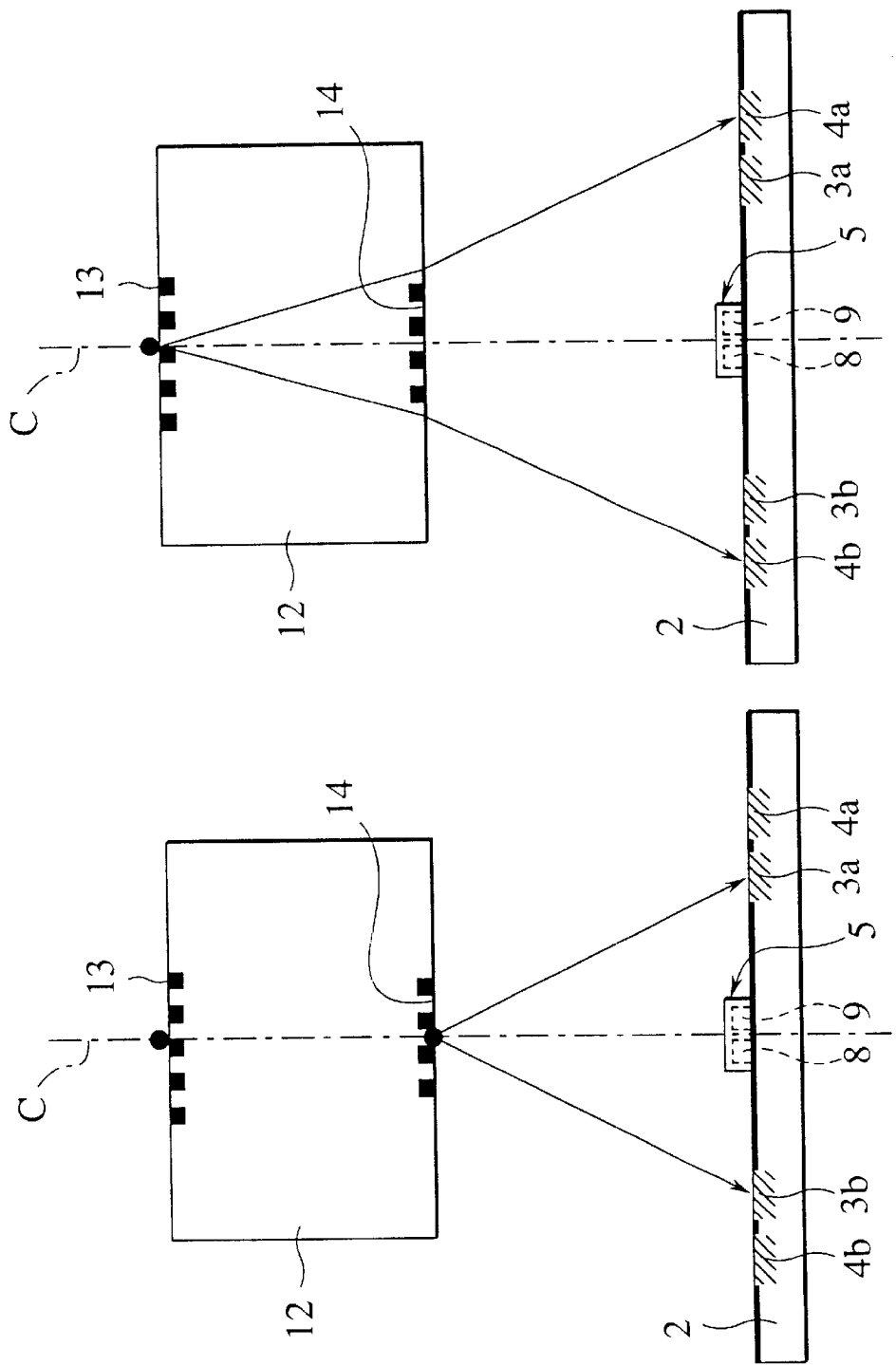

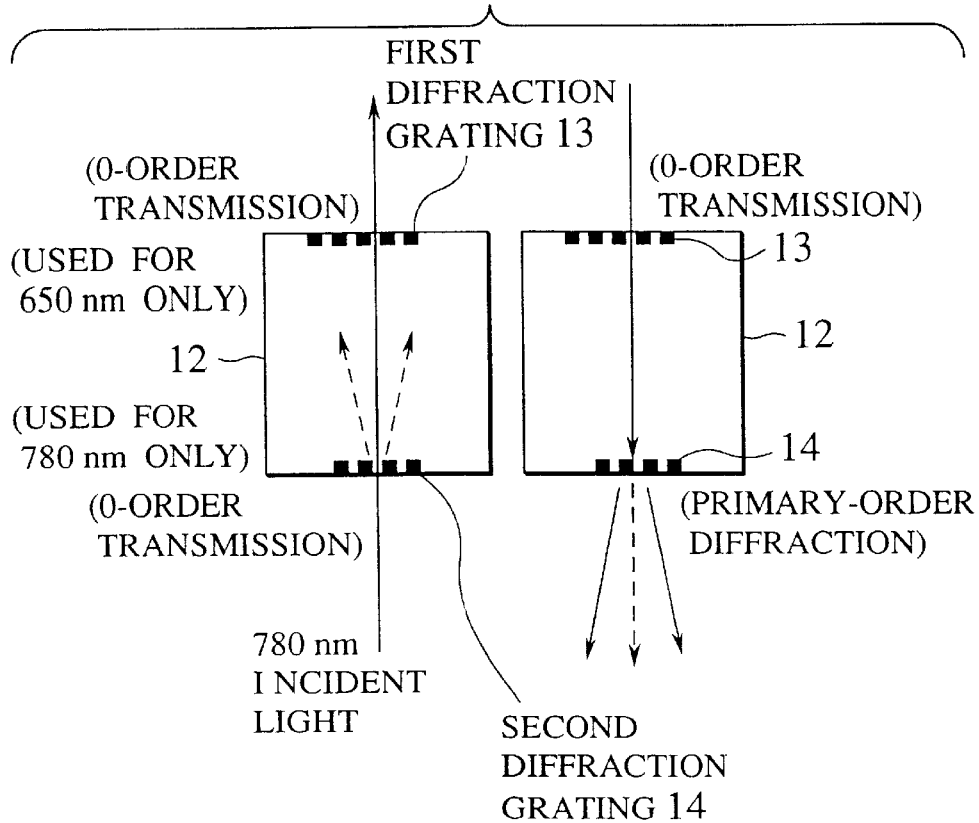
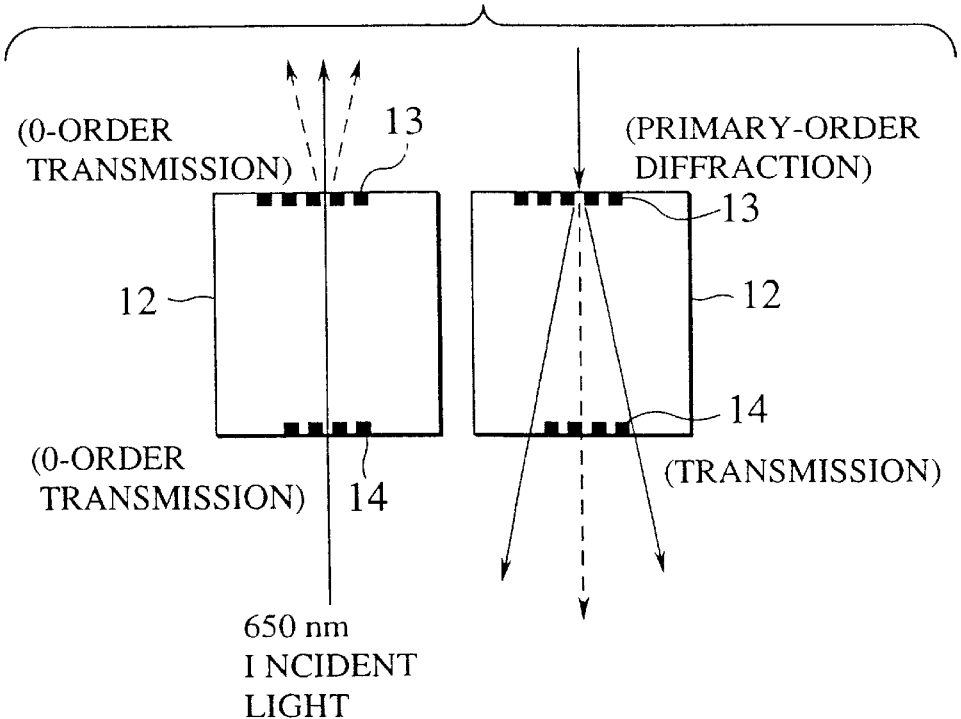

NOTE: ↔ INDICATES PARALLEL TO THIS PAPER SURFACE
⊙ INDICATES A POLARIZATION PERPENDICULAR TO THE PAPER SURFACE

OPTICAL PICKUP HAVING TWO LASER BEAM SOURCES HAVING WAVE LENGTHS DIFFERENT FROM EACH OTHER AND OPTICAL DEVICE INCLUDING THE OPTICAL PICKUP

BACKGROUND OF THE INVENTION

1. Field of the Invention

The present invention relates to an optical pickup and optical device for use in a playback unit for an information recording medium such as an optical disc and more particularly to an optical pickup and optical device preferable for a compatible playback system for digital versatile disc (DVD) and compact disc-write once (CD-R).

2. Description of the Related Art

Currently, a DVD system has been proposed and marketed, and its prevalence has started, the DVD system having a higher density than an optical compact disc (CD) which had already prevailed as a consumer product. In DVD player as a playback unit of this system, compatible playback with CD is indispensable to avoid an overlapping of the devices and complexity of operation upon use. Likewise, the DVD player is also required to be compatible with the CD-R which can be played back by the CD player. A technology for playing back discs of various standards has been developed and further, simplification and reduction of cost for achieving it are problems to be solved.

For the aforementioned CD-R, a laser beam source having 780 nm band laser beam source different from 650 nm band for the DVD is required because reflectivity of an information recording medium has a high wave length dependency and therefore, an optical pickup containing a light source for two wave lengths (wavelengths) is necessary.

FIG. 1 is a schematic structure diagram of a conventional example of the optical pickup device. Referring to FIG. 1, a first laser beam source 51 is fixed on a first light receiving device (photodetector) substrate 50 and this first laser beam source 51 emits a light having a wave length (wavelength) of 650 nm. An emission light from the first laser beam source 51 passes through a first hologram device 52, and a light transmitting through a half mirror 53 is converged by an objective lens 54 and irradiated onto a disc 55 as an information recording medium. A light reflected by the disc 55 is introduced to the hologram device 52 through the objective lens 54 and half mirror 53, and in the hologram device 52, the light is diffracted and divided. Then, ±primary-order (± 1st-order) diffracted light is irradiated to the first light receiving device substrate 50. A second laser beam source 57 is fixed on a second light receiving device (photodetector) substrate 56 and the second laser beam source 57 emits a light having a wave length of 780 nm. An emission light from the second laser beam source 57 passes through a second hologram device 58 and is reflected by the half mirror 53 and converged by the objective lens 54 and irradiated to the disc 55 as an information recording medium. A light reflected by the disc 55 is introduced to the second hologram device 58 again through the objective lens 54 and half mirror 53. In the hologram device 58, the light is diffracted and divided and the ±primary-order (± 1st-order) diffracted light is irradiated to the second light receiving device substrate 56.

FIG. 2 is a schematic structure diagram of other conventional example of the optical pickup device. In FIG. 2, a first laser beam source 60 and a second laser beam source 61 are disposed in the vicinity of each other. The first laser beam source 60 emits a light having a wave length of 650 nm and the second laser beam source 61 emits a light having a wave length of 780 nm. The emission lights from the first laser beam source 60 and second laser beam source 61 are emitted along substantially the same optical axis and reflected by a half mirror 62. The reflected lights are converged by an objective lens 63 and irradiated to a disc 64 as an information recording medium. Light reflected by the disc 64 passes through the objective lens 63, passes through the half mirror 62 and is irradiated to a light receiving device substrate 65.

However, because, in the former conventional example, optical paths from the laser beam sources 51, 57 to the half mirror 53 of the respective wave lengths are different from each other and the first laser beam source 51 and first light receiving device substrate 50 are disposed apart from the second laser beam source 57 and second light receiving device substrate 56, therefore, the optical pickup cannot be constructed in a compact configuration.

In the latter conventional example, the first laser beam source 60 and second laser beam source 61 are disposed in the vicinity of each other and although the optical paths thereof are the same, an optical path of incident light to the disc 64 is different from that of reflected light from the disc 64. Consequently, the first and second laser beam sources 60, 61 are disposed at a different position from that of the light receiving device substrate 65. Therefore, the optical pickup can be constructed in a compact configuration like the former example.

Here, such a structure in which the optical paths of the respective lights are the same and an optical path of an incident light to a disc coincides with that of a reflected light from the disc can be considered. In this case, a means for diffracting and dividing lights having different wave lengths is indispensable and further, if such a means is just disposed, usability of light from a laser beam source up to a light receiving device substrate via the disc drops considerably, so that practicability thereof is very low.

On the other hand, in a case for producing an optical device for the former conventional optical pickup, although as shown in FIG. 1, an optical device 70 in which a first laser beam source 51, a first light receiving device substrate 50 and a first hologram device 52 are integrally fixed in a casing(package) and an optical device 71 in which a second laser beam source 57, a second light receiving device substrate 56 and a second hologram 58 are integrally fixed in a casing(package) can be constructed in a compact configuration each, this example cannot make it possible to combine these optical devices to produce a compact single optical device.

In case for producing an optical device for the latter conventional optical pickup, although as shown in FIG. 2, an optical device 73 in which a first laser beam source 60 and a second laser beam source 61 are fixed in a casing(package) can be constructed, this example cannot make it possible to combine the first and second laser beam sources 60, 61, light receiving device substrate 65 and the like to produce a compact single optical device.

SUMMARY OF THE INVENTION

Accordingly, the present invention is achieved to solve the above problems, and therefore it is an object of the invention to provide an optical pickup and optical device in which light usability in a process from a laser beam source up to a light receiving device substrate hardly deteriorates unlike a conventional example and which can be constructed in a compact configuration.

To achieve the above object, according to a first aspect of the present invention, there is provided an optical pickup for irradiating light to an information recording medium and reading information by using a reflected light from the information recording medium, the optical pickup comprising: a first laser beam source having a first wave length; a second laser beam source having a second wave length; a first diffraction grating; a second diffraction grating provided on a face different from a face on which the first diffraction grating is provided; and a light receiving device substrate having a plurality of light receiving regions on the same plane, wherein the first laser beam source and the second laser beam source are disposed in the vicinity of each other, emission lights from the first laser beam source and the second laser beam source are emitted to the information recording medium along substantially the same optical axis and a reflected light from the information recording medium is returned along the optical axis; the first diffraction grating, the second diffraction grating and the light receiving device substrate are disposed in order substantially perpendicular to the optical axis; the first diffraction grating is substantially transparent for any one of the first wave length and the second wave length and diffracts the other wave length; and the second diffraction grating is substantially transparent for the other wave length while it diffracts the one wave length.

According to the present invention, a light emitted from the first laser beam source having a first wave length is diffracted by the second diffraction grating and this 0-order (0th-order) diffracted light is substantially transmitted through the first diffraction grating and then introduced toward the information recording medium. A reflected light from the information recording medium substantially is transmitted through the first diffraction grating and this light is diffracted by the second diffraction grating. Then, the ±primary-order diffracted light is irradiated to the light receiving device substrate. A light emitted from the second laser beam source having a second wave length passes through the second diffraction grating and this passing light is diffracted by the first diffraction grating. The 0-order (0th-order) diffracted light is introduced toward the information recording medium and a reflected light from the information recording medium is diffracted by the first diffraction grating. The ±primary-order diffracted light substantially is transmitted through the second diffraction grating and is irradiated to the light receiving device substrate. Thus, when a light having the first wave length and a light having the second wave length substantially pass through any one of the first and second diffraction gratings, they substantially are transmitted therethrough, and only when they pass through the other, they are diffracted. Consequently, light usability in a process from the first and second laser beam sources up to the light receiving device substrate is substantially the same as that of a conventional example. Further, because it is so constructed that the first laser beam source and second laser beam source are disposed in the vicinity of each other, emission lights from the first laser beam source and second laser beam source are emitted to the information recording medium along substantially the same optical axis and the reflected lights are returned along substantially the same optical axis as above-mentioned optical axis, the first laser beam source/second laser beam source and the light receiving device substrate can be disposed in the vicinity of each other, so that a compact optical pickup can be constructed.

To achieve the above object, according to a second aspect of the present invention, there is provided an optical pickup for irradiating light to an information recording medium and reading information by using a reflected light from the information recording medium, the optical pickup comprising: a first laser beam source having a first wave length and a linearly polarized light; a second laser beam source having a second wave length and a linearly polarized light substantially perpendicular to the polarized light of the first laser beam source; a first diffraction grating; a second diffraction grating provided on a face different from a face on which the first diffraction grating is provided; and a light receiving device substrate having a plurality of light receiving regions on the same plane, wherein the first laser beam source and the second laser beam source are disposed in the vicinity of each other, emission lights from the first laser beam source and the second laser beam source are emitted to the information recording medium along substantially the same optical axis and a reflected light from the information recording medium is returned along the optical axis; the first diffraction grating, the second diffraction grating and the light receiving device substrate are disposed in order substantially perpendicular to the optical axis; any one of the first diffraction grating and the second diffraction grating is substantially transparent for a linearly polarized light of any one of the first laser beam source and the second laser beam source and diffracts the other linearly polarized light; and the other one of the first diffraction grating and the second diffraction grating is substantially transparent for a wave length possessed by a laser beam source whose laser beam is diffracted by the first diffraction grating, of the first and second laser beam sources, and diffracts a wave length possessed by a laser beam source whose laser beam substantially is transmitted through the first diffraction grating, of the first and second laser beam sources.

According to the present invention, a light emitted from the first laser beam source, having the first wave length and linearly polarized light is diffracted by the second diffraction grating. Its 0-order diffracted light substantially is transmitted through the first diffraction grating and is introduced toward the information recording medium. A reflected light from the information recording medium substantially passes through the first diffraction grating and this light is diffracted by the second diffraction grating and the ±primary-order diffracted light is irradiated to the light receiving device substrate. A light emitted from the second laser beam source, having the second wave length and a linearly(linear) polarized light perpendicular to the linearly(linear) polarized light from the first laser beam source is transmitted through the second diffraction grating. This passing light is diffracted by the first diffraction grating in a polarized state and the 0-order diffracted light is introduced toward the information recording medium. A reflected light from the information recording medium is diffracted by the first diffraction grating in a polarized state and its ±primary-order diffracted light substantially is transmitted through the second diffraction grating and is irradiated to the light receiving device substrate. Thus, when a light having the first wave length and a light having the second wave length pass through any one of the first and second diffraction gratings, they substantially are transmitted therethrough, and only when they pass through the other, they are diffracted. Consequently, light usability in a process from the first and second laser beam sources up to the light receiving device substrate is substantially the same as that of a conventional example. Further, because it is so constructed that the first laser beam source and second laser beam source are disposed in the vicinity of each other, emission lights from the first laser beam source and second laser beam source are emitted to the information recording medium along substantially the same optical axis and the reflected lights are returned along substantially the same optical axis as above-mentioned optical axis, the first laser beam source/second laser beam source and the light receiving device substrate can be disposed in the vicinity of each other, so that a compact optical pickup can be constructed.

To achieve the above object, according to a third aspect of the present invention, there is provided an optical pickup for irradiating light to an information recording medium and reading information by using a reflected light from the information recording medium, the optical pickup comprising: a first laser beam source having a first wave length and a linearly polarized light; a second laser beam source having a second wave length and a linearly polarized light substantially the same as the first laser beam source; a wave length plate; a first diffraction grating; a second diffraction grating provided on a face different from a face on which the first diffraction grating is provided; and a light receiving device substrate having a plurality of light receiving regions on the same plane, wherein the first laser beam source and the second laser beam source are disposed in the vicinity of each other, emission lights from the first laser beam source and the second laser beam source are emitted to the information recording medium along substantially the same optical axis and a reflected light from the information recording medium is returned along the optical axis; the wave length plate, the first diffraction grating, the second diffraction grating and the light receiving device substrate are disposed in order from the information recording medium substantially perpendicular to the optical axis; any one of the first diffraction grating and the second diffraction grating is substantially transparent for linearly polarized lights of emission lights from the first laser beam source and the second laser beam source and diffracts a linearly polarized light substantially perpendicular to the linearly polarized lights from the first and second diffraction gratings, the other one of the first diffraction grating and the second grating is substantially transparent for a wave length possessed by a laser beam source whose beam is diffracted by the first diffraction grating, of the first and second laser beam sources and diffracts a wave length possessed by a laser beam source whose beam substantially passes through the first diffraction grating, of the first and second laser beam sources; and the wave length plate provides a wave length of emission light which substantially is transmitted through the first diffraction grating with a phase difference of ¼ wave length.

According to the present invention, a light emitted from the first laser beam source, having the first wave length and linearly polarized light is diffracted by the second diffraction grating. Its 0-order diffracted light substantially is transmitted through the first diffraction grating, further transmitted through the wave length plate and is introduced toward the information recording medium. A reflected light from the information recording medium substantially is transmitted through the wave length plate and further is transmitted through the first diffraction grating and this light is diffracted by the second diffraction grating and its ±primary-order diffracted light is irradiated to the light receiving device substrate. A light emitted from the second laser beam source, having the second wave length and a linearly polarized light substantially the same as that of the first laser beam source passes through the second diffraction grating. This transmitting light is transmitted through the first diffraction grating and is provided with a phase difference of ¼ wave length . The light whose phase is changed is introduced toward the recording medium. A reflected light from the information recording medium is further provided with a phase difference of ¼ wave length by the wave length plate so as to be changed to a linearly polarized light perpendicular to that of the incident light. This light is diffracted by the first diffraction grating in a polarized state and its ±primary-order diffracted light substantially is transmitted through the second diffraction grating and then is irradiated to the light receiving device substrate. Consequently, when an emission light from any one of the first laser beam source and the second laser beam source passes through any one of the first and second diffraction gratings, they substantially are transmitted therethrough, and only when they pass through the other, they are diffracted. Consequently, light usability in a process from any one of the first and second laser beam sources up to the light receiving device substrate is substantially the same as an conventional example. Further, when an emission light from the other one of the first laser beam source and second laser beam source is introduced to the information recording medium, it substantially is transmitted through both the first and second diffraction gratings. Then, the light is diffracted by one of the first and second diffraction gratings first after it is reflected by the information recording medium to return to the light receiving device substrate. Consequently, light usability in a process from the other one of the first and second laser beam sources up to the light receiving device substrate is far more excellent than a conventional example. Further, because it is so constructed that the first laser beam source and second laser beam source are disposed in the vicinity of each other, emission lights from the first laser beam source and second laser beam source are emitted to the information recording medium along substantially the same optical axis and the reflected lights are returned along substantially the same optical axis as the former optical axis, the first laser beam source/second laser beam source and the light receiving device substrate can be disposed in the vicinity of each other, so that a compact optical pickup can be constructed.

To achieve the above object, according to a fourth aspect of the present invention, there is provided an optical device for use in the optical pickup described in the first aspect wherein the first laser beam source, the second laser beam source, the first diffraction grating, the second diffraction grating and the light receiving device substrate are integrally fixed in the same casing.

The optical device according to the fourth aspect of the invention is capable of obtaining the same effect as the optical pickup described in the first aspect.

To achieve the above object, according to a fifth aspect of the present invention, there is provided an optical device for use in the optical pickup described in the second aspect wherein the first laser beam source, the second laser beam source, the first diffraction grating, the second diffraction grating and the light receiving device substrate are integrally fixed in the same casing.

The optical pickup according to the fifth aspect of the invention is capable of obtaining the same effect as the optical pickup described in the second aspect.

To achieve the above object, according to a sixth aspect of the present invention, there is provided an optical device for use in the optical pickup described in the third aspect wherein the first laser beam source, the second laser beam source, the wave length plate, the first diffraction grating, the second diffraction grating and the light receiving device substrate are integrally fixed in the same casing.

The optical device according to the sixth aspect of the present invention is capable of obtaining the same effect as the optical pickup of the second aspect.

The nature, principle and utility of the invention will become more apparent from the following detailed description when read in conjunction with the accompanying drawings.

BRIEF DESCRIPTION OF THE DRAWINGS

In the accompanying drawings:

FIGS. 4A, 4B are diagrams showing irradiation positions on a light receiving device substrate of emission beams from first and second laser beam sources;

FIGS. 5A, 5B are diagrams showing diffraction and transmission at first and second diffraction gratings of the emission beams of the first and second laser beam sources in the first embodiment of the present invention;

DESCRIPTION OF THE PREFERRED EMBODIMENTS

Hereinafter, the embodiments of the present invention will be described with reference to the accompanying drawings.

Figure 1:
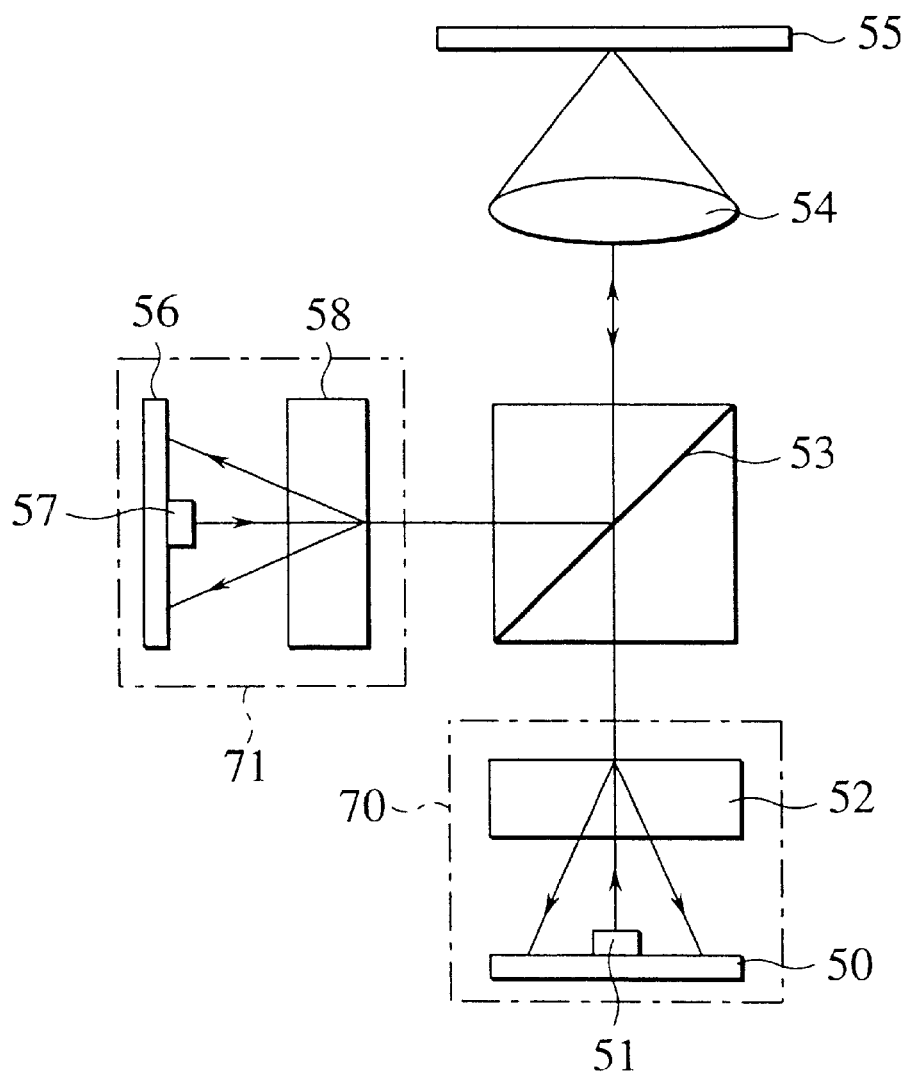
FIG. 1 is a schematic structure drawing of a conventional optical pickup.
Figure 2:
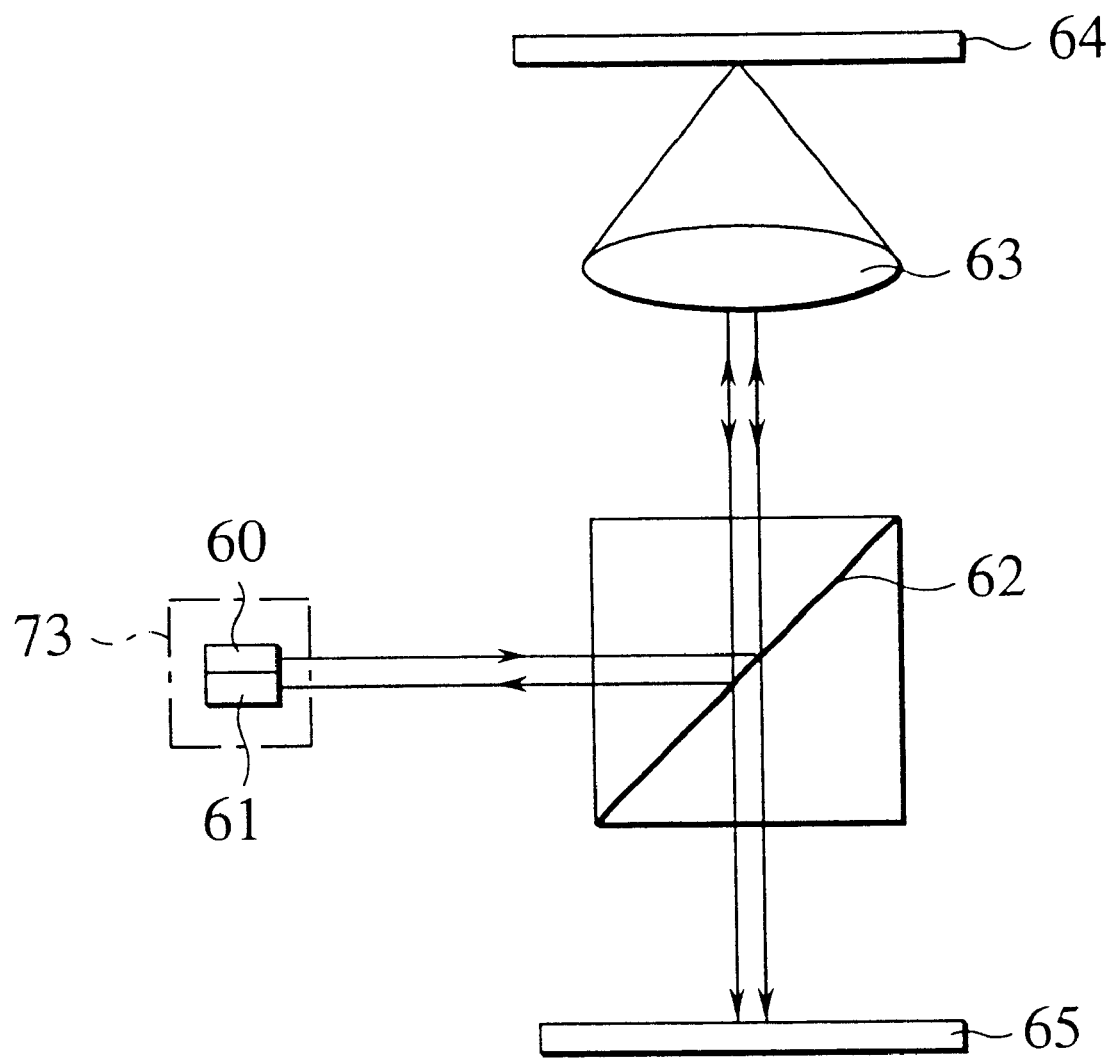
FIG. 2 is a schematic structure drawing of other conventional optical pickup.
Figure 3:
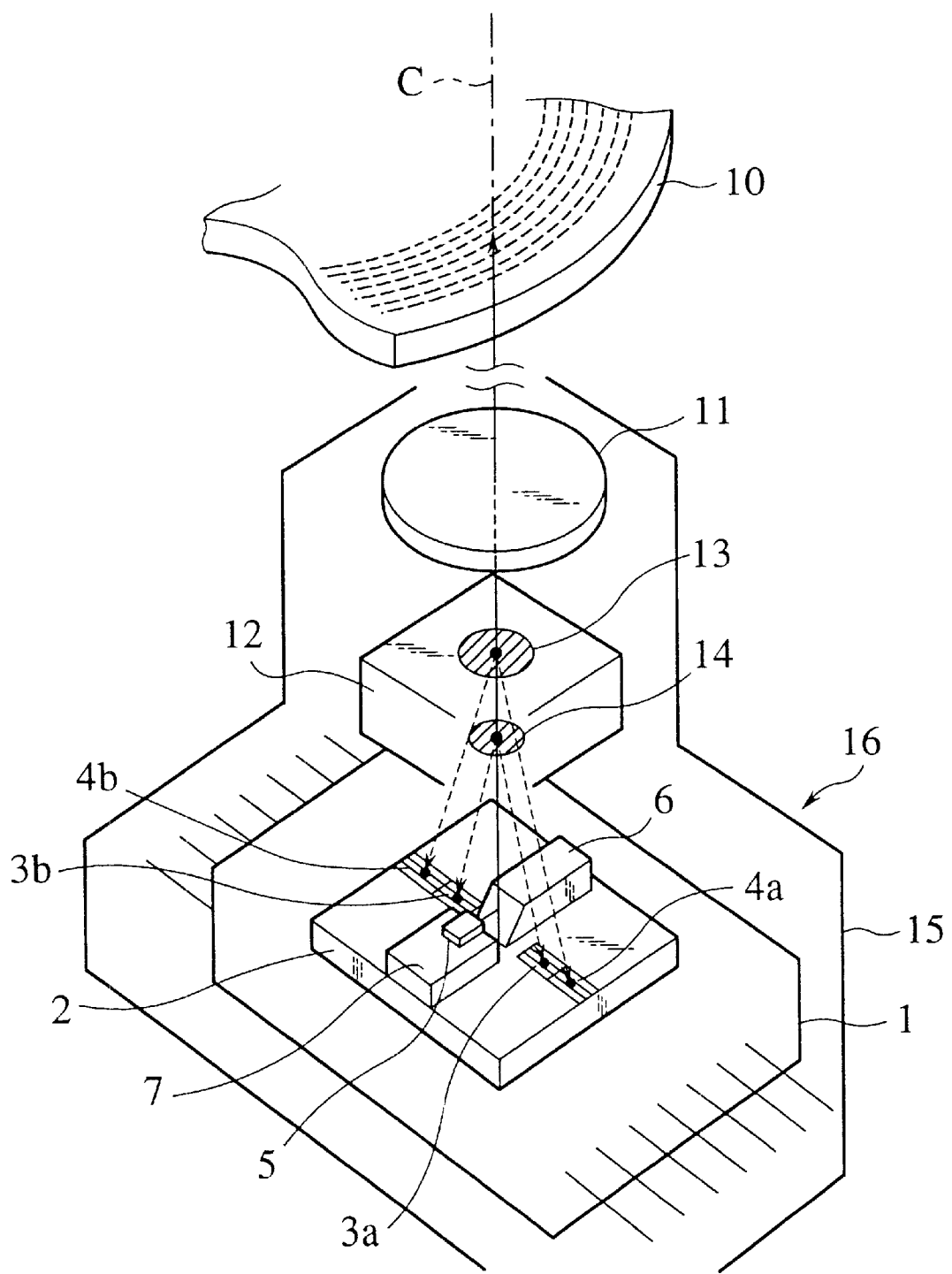
FIG. 3 is a schematic perspective view of an optical pickup according to a first embodiment of the present invention.

FIGS. 3–5 show the first embodiment of the present invention. Referring to FIGS. 3–5, a light receiving device (photodetector) substrate 2 is fixed on a wiring substrate 1 and four light receiving regions 3a, 3b, 4a, 4b are disposed on a straight line on this light receiving device substrate 2. The four light receiving regions 3a, 3b, 4a, 4b are disposed on the same plane and are composed of a pair of inner light receiving regions 3a, 3b and a pair of outer light receiving regions 4a, 4b, which are disposed with respect to a point which an optical axis C passes.

A laser beam source device 5 and a micro mirror 6 are fixed at a position turned at 90° with respect to the four light receiving regions 3a, 3b, 4a, 4b disposed on a straight line on the light receiving device substrate 2. The laser beam source device 5 is fixed on the light receiving device substrate 2 via a sub-mount member 7 and the laser beam source device 5 has a first laser beam source 8 (shown in FIGS. 4A, 4B) and a second laser beam source 9 (shown in FIGS. 4A, 4B). According to the first embodiment, the first laser beam source 8 and second laser beam source 9 are both semiconductor laser, which are formed monolithically on the same chip. The first laser beam source 8 and second laser beam 9 are disposed adjacent to each other and emission beams are emitted horizontally along almost the same optical axis. The first laser beam source 8 emits a beam having a first wave length of 780 nm and the second laser beam source 9 emits a beam having a second wave length of 650 nm.

The micro mirror 6 is so constructed that a surface opposing the laser beam source device 5 is a mirror face (not provided with a reference numeral) and this mirror face is inclined at 45° with respect to a horizontal face. Respective emission beams from the first laser beam source 8 and second laser beam source 9 are reflected by the micro mirror 6 so as to be converted to vertical beams having almost the same optical axis C. The vertical emission beams from the first laser beam source 8 and second laser beam source 9 through almost the same optical axis C are emitted to a disc 10 as an information recording medium and the beams are reflected by the disc 10. Meanwhile, almost the same optical axis C is a concept including completely the same in this specification.

On this vertical optical axis C, an objective lens 11 and a transparent sheet-like(plate) member 12 are disposed from the side of the disc 10. The objective lens 11 converges beams introduced from the first and second laser beam sources 8, 9 via a transparent sheet-like member 12 to an information recording layer (not shown) of the disc 10.

A first diffraction grating 13 is formed on a top face of the transparent sheet-like member 12 and a second diffraction grating 14 is formed on a bottom face thereof. That is, the second diffraction grating 14 is formed on a different face from the first diffraction grating 13.

The aforementioned first diffraction grating 13, second diffraction grating 14 and light receiving device substrate 2 are disposed such that the centers of the respective components are positioned almost on the optical axis C and they are disposed substantially perpendicular to the optical axis C. Meanwhile the "substantially vertical(perpendicular)" a mentioned in this specification is a concept including accurately vertical(perpendicular).

The first diffraction grating 13 is provided with wave length selectivity by only a depth of unevenness of the surface and so constructed as to allow a wave length of 780 nm to be transmitted through and diffract a wave length of 650 nm. As regards the reflected light from the disc 10, a diffraction angle of ±primary-order (±1st-order) diffracted beam by diffraction and the position of the light receiving device substrate 2 are set up so that the ±primary-order diffracted beam is irradiated to a pair of the outer light receiving regions 4a, 4b. Light irradiated to a pair of the outer light receiving regions 4a, 4b are photoelectrically converted so as to be used for information reading, focus error detection, tracking error detection and the like in a playback unit using a wavelength of 650 nm.

Although the second diffraction grating 14 is provided with wave length selectivity by only the depth of unevenness of the surface like the aforementioned first diffraction grating 13, different from the first diffraction grating 13, it diffracts beam having a wave length of 780 nm while it allows substantially all beam having a wave length of 650 nm to be transmitted through. As regards a beam reflected from the disc 10, a diffraction angle of the ±primary-order diffracted beam by diffraction and a position of the light receiving device substrate 2 are set up so that the ±primary-order diffracted beam is irradiated to a pair of inner light receiving regions 3a, 3b. Light irradiated to a pair of the inner light receiving regions 3a, 3b are photoelectrically converted so as to be used for information reading, focus error detection, tracking error detection and the like in a playback unit using a wavelength of 780 nm.

The objective lens 11, transparent sheet-like member 12, laser beam source device 5, light receiving device substrate 2 and wiring substrate 1 are fixed integrally to the same casing(package) 15. That is, this optical device 16 of an optical system of the optical pickup can be constructed so as to excel in compact integration.

Next, an operation of the above-described structure will be described. If beam having the wave length of 780 nm and beam having the wave length of 650 nm are emitted from the first laser beam source 8 and second laser beam source 9, the emitted incident lights are reflected by the micro mirror 6 so as to be incident light to the disc 10 having the optical axis C in the vertical direction. The incident light along the optical axis C is subjected to diffraction/transmission which will be described below, by the second diffraction grating 14 and first diffraction grating 13, passes through the transparent sheet-like member 12, is converged by the objective lens 11 and then irradiated to the disc 10 as a converged light. The reflected light from the disc 10 goes along the aforementioned optical axis C like the incident light and is introduced to the objective lens 11 and transparent sheet-like member 12. This light is subjected to diffraction/transmission by the first diffraction grating 13 and second diffraction grating 14, passes through the transparent sheet-like member 12 and then is irradiated to the light receiving device substrate 2.

The diffraction/transmission of the first and second diffraction gratings 13, 14 will be described with reference to FIGS. 5A, 5B. As shown in FIG. 5A, an incident light from the first laser beam source 8 is a light having the wave length of 780 nm and this incident light is subjected to diffraction by the diffraction grating 14, so that the 0-order transmission light is transmitted substantially all through the first diffraction grating 13 and irradiated to the disc 10. A reflected light from the disc 10 is transmitted substantially all through the first diffraction grating 13 and this transmitted light is subjected to diffraction/branching by the second diffraction grating 14. The ±primary-order diffracted light by this diffraction is irradiated to a pair of the inner light receiving regions 3a, 3b of the light receiving device substrate 2.

As shown in FIG. 5B, an incident light from the second laser beam source 9 is a beam having the wave length of 650 nm. This incident light is transmitted substantially all through the second diffraction grating 14 and this transmitted light is subjected to diffraction by the first diffraction grating, so that the 0-order (0th-order) transmitted light is irradiated to the disc 10. A reflected light from the disc 10 is subjected to diffraction/branching by the first diffraction grating 13. The ±primary-order diffracted light by diffraction is transmitted substantially all through the second diffraction grating 14 and irradiated to a pair of the outer light receiving regions 4a, 4b of the light receiving device substrate 2.

That is, a light having the wave length of 780 nm substantially is transmitted through the first diffraction grating 13 and only when it passes through the second diffraction grating 14, it is subjected to diffraction. A light having the wave length of 650 nm substantially is transmitted through the second diffraction grating 14 and only when it passes through the first diffraction grating 13, it is subjected to diffraction. Thus, light usability of each wave length between the first/second laser beam sources 8, 9 and the light receiving device substrate 2 is substantially the same as conventionally.

Because it is so constructed that the first laser beam source 8 and the second laser beam source 9 are disposed adjacent to each other, emission lights from the first laser beam source 8 and the second laser beam source 9 are emitted to the disc 10 along substantially the same optical axis C and the reflected lights return along the same optical axis C, the first laser beam source 8/second laser beam source 9 and the light receiving device substrate 2 can be disposed in the vicinity of each other so that a compact optical pickup can be constructed. For the same reason, the optical system of the optical pickup can be constructed as a single optical device 16.

Figure 6:
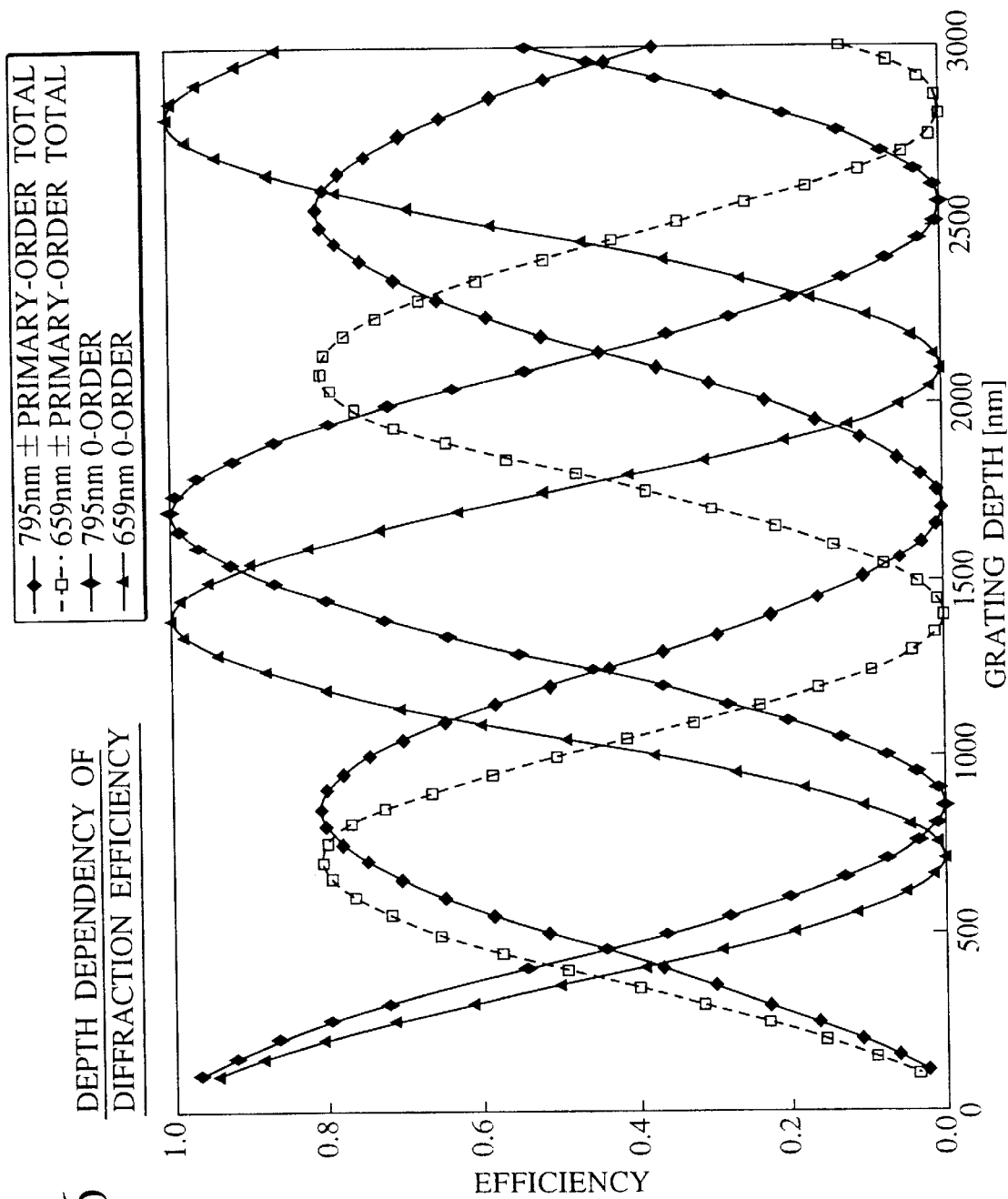
FIG. 6 is a characteristic diagram showing depth dependency of a diffraction grating in case where wave length is 795 nm and 659 nm.

FIG. 6 is a characteristic diagram showing depth dependency of the diffraction grating in case where the wave length is 795 nm and 659 nm. By changing the depth of the diffraction grating, diffraction efficiency changes periodically. Although this is slightly different from the wave length used in the first embodiment, it is considered that there exists a similar depth dependency of the diffraction grating between the wave lengths of 780 nm and 650 nm.

Referring to FIG. 6, in case where the depth of the diffraction grating is near 1400 nm, the efficiency of the 0-order (0th-order) diffracted light of 659 nm light is substantially 1.0, that is, this light substantially is transmitted through. As for 795 nm light, the efficiency of the ±primary-order diffracted light is substantially 0.2. In case where the depth of the diffraction grating is near 1700 nm, the efficiency of the 0-order diffracted light of the 795 nm light is substantially 1.0, that is, this light substantially is transmitted through. As for the 659 nm light, the efficiency of the ±primary-order diffracted light is substantially 0.3. Wave length selectivity can be provided depending on the depth of the diffraction grating.

Figure 7:
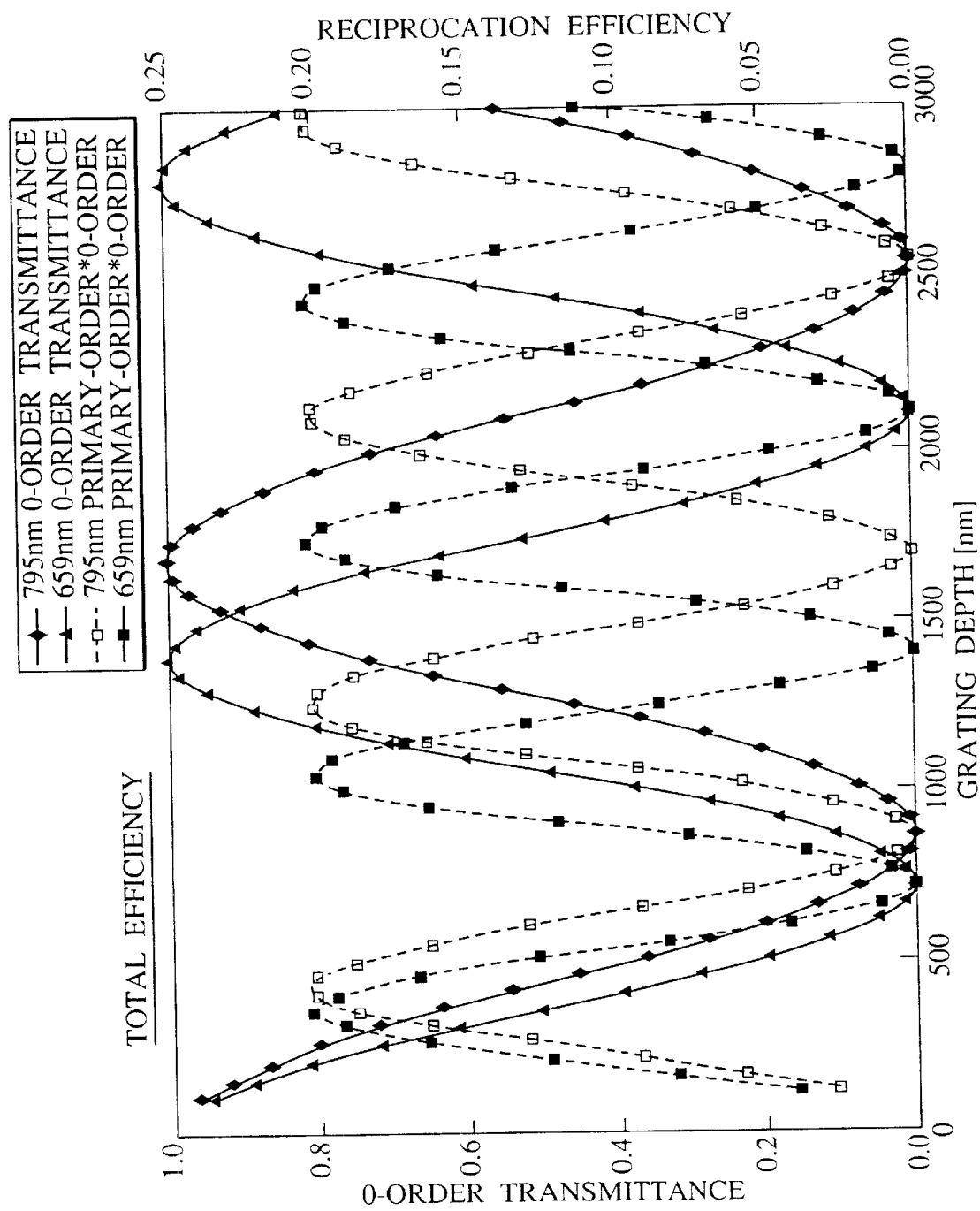
FIG. 7 is a characteristic diagram showing total efficiency (reciprocation efficiency of 0-order diffracted beam, and 0-order diffracted beam X±primary-order diffracted beam) of depth dependency of diffraction grating in case where the wave length is 795 nm and 659 nm.

FIG. 7 is a characteristic diagram showing total efficiency of depth dependency of the diffraction grating in case where the wave length is 795 nm and 659 nm. Because light passes through the first and second diffraction gratings 13, 14 twice in both the directions and further, the diffracted light for use is 0-order diffracted light and ±primary-order diffracted light, the depth of the diffraction grating needs to be set up so that a reciprocation efficiency expressed by a product of the 0-order diffracted light and ±primary-order diffracted light is high. Referring to FIG. 7, in case where the depth of the diffraction grating is near 1400 nm, a reciprocation efficiency of about 0.17 can be obtained for light having the wave length of 795 nm. In case where the depth of the diffraction grating is near 1700 nm, a reciprocation efficiency of about 0.19 can be obtained for light having the wave length of 659 nm.

Although the transmittance of the wave length of a passing light near 1400 nm and 1700 nm in depth of the diffraction grating is substantially 1.0, indicating a maximum value, this position deflects from a maximum value of the above reciprocation efficiency. Setting of the depth of the diffraction grating is carried out considering the transmittance of the wave length of the light to be transmitted and the reciprocation efficiency of the wave length for use.

In the first embodiment, the first diffraction grating 13 and the second diffraction grating 14 may be so constructed that the wave length dependency thereof are inverted. That is, it is permissible to provide the first diffraction grating 13 with the wave length selectivity by only the depth of unevenness of the surface, so that a light having the wave length of 780 nm is diffracted and a light having the wave length of 650 nm is substantially transmitted through, and provide the second diffraction grating 14 with the wave length selectivity by only the depth of the unevenness of the surface, so that a light having the wave length of 780 nm is substantially transmitted through and a light having the wave length of 650 nm is diffracted. With such a structure, the light receiving regions 3a, 3b, 4a, 4b irradiated with respective wave length lights can be set up in reverse positions.

Figure 8A:
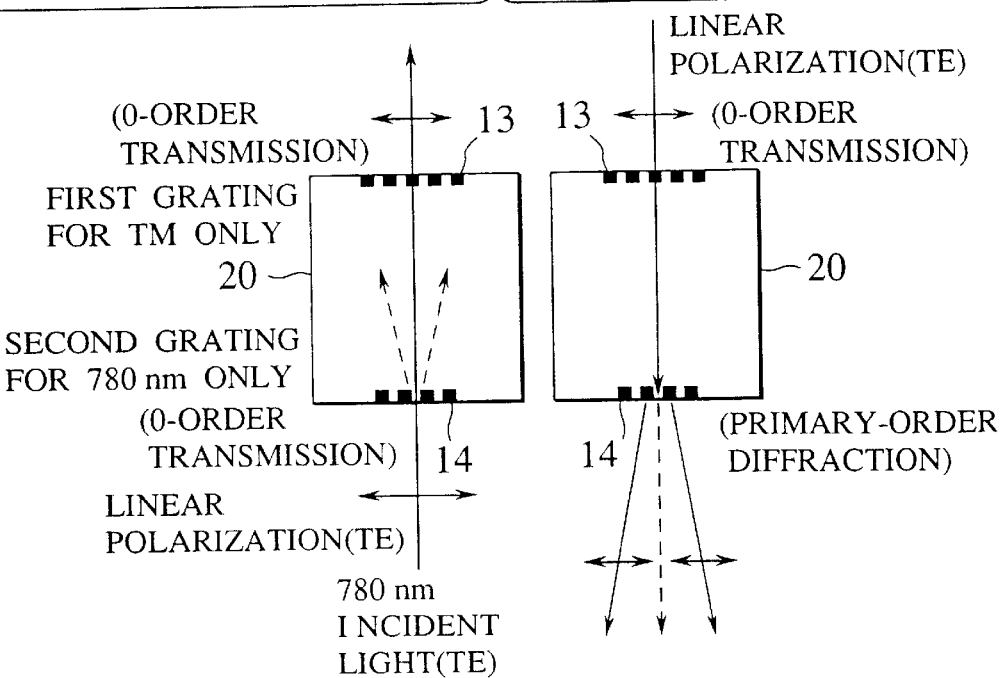
FIGS. 8A, 8B are diagrams showing diffraction and transmission at first and second diffraction gratings of the emission beams of the first and second laser beam sources in the second embodiment of the present invention.
Figure 8B:
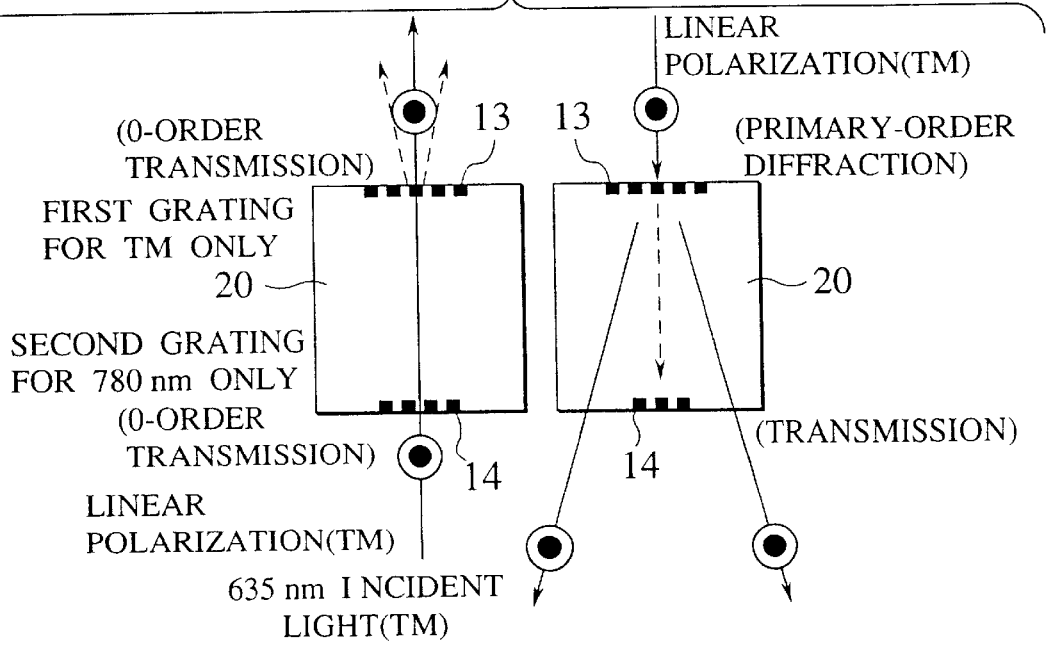

FIGS. 8A, 8B show a second embodiment of the present invention. FIG. 8A is a diagram showing diffraction and transmission of an emission light from the first laser beam source at the first and second diffraction gratings 13, 14. FIG. 8B is a diagram showing diffraction and transmission of an emission light from the second laser beam source at the first and second diffraction gratings 13, 14. In the second embodiment, a description of the same components as the first embodiment is omitted, but only a different structure will be described.

That is, the first laser beam source has the wave length of 780 nm and emits linearly polarized light of TE mode. The second laser beam source has the wave length of 635 nm and emits a linearly polarized light of TM mode which is substantially perpendicular to deflected light of the first laser beam source.

Instead of the transparent sheet-like member 12 of the first embodiment, an optically anisotropic material member 20 is disposed. As shown in FIGS. 8A, 8B, a first diffraction grating 13 is formed on a top surface of the optically anisotropic material member 20 and a second diffraction grating 14 is formed on a bottom surface thereof. The first diffraction grating 13 is provided with polarization dependency by forming the optically anisotropic material member according to region selective refractivity change so that a linearly(linear) polarized light of TE mode is substantially transmitted through and the linearly(linear) polarized light of TM mode is diffracted. For example, this can be achieved by forming this structure on the surface of lithium niobate by proton exchange. The second diffraction grating 14, similar to the first embodiment, is provided with the wave length selectivity by only the depth of the unevenness of the surface so that a light having the wave length of 780 nm is diffracted and a light having the wave length of 635 nm is substantially transmitted through.

As shown in FIG. 3, the objective lens, optically anisotropic material member 20, laser beam source device 5, light receiving device substrate 2 and wiring substrate 1, these components constituting an optical system of the optical pickup, are fixed to the same casing(package) integrally. That is, they are constructed as an optical device for constituting the optical system of the optical pickup.

Next, an operation of the above structure will be described. The optical path of light emitted from the first and second laser beam sources is the same as the first embodiment and different therefrom in an operation of the invention when light passes through the optically anisotropic material member 20 on two ways. That is, referring to FIG. 8A, a beam having a wave length of 780 nm and a linearly polarized light of TE mode, emitted from the first laser beam source 8 is diffracted by the second diffraction grating 14 and the 0-order diffracted light is substantially transmitted through the first diffraction grating 13 so that it is introduced to the disc 10. A reflected light from the disc 10 is substantially transmitted through the diffraction grating 13 and this light is diffracted by the second diffraction grating 14, so that this ±primary-order diffracted light is irradiated to the light receiving device substrate 2.

Referring to FIG. 8B, a beam having the wave length of 635 nm and a linearly polarized light of TM mode, emitted from the second laser beam source 9 is transmitted through the second diffraction grating 14 and this transmitted light is subjected to diffraction by the first diffraction grating 13, so that the 0-order diffracted light is introduced to the disc 10. The reflected light from the disc 10 is subjected to diffraction by the first diffraction grating 13 and this ±primary-order deflected light is substantially transmitted through the second diffraction grating 14, so that it is irradiated to the light receiving device substrate 2.

Therefore, both the light having the wave length of 780 nm and the light having the wave length of 650 nm are substantially transmitted through when they pass through any one of the first and second diffraction gratings, and diffracted when they pass through the other thereof. Therefore, light usability of the respective wave lengths between the first/second laser beam sources 8, 9 and the light receiving device substrate 2 is substantially the same as conventionally.

Further, because like the first embodiment, the first laser beam source 8 and the second laser beam source 9 are disposed adjacent to each other, emission lights from the first laser beam source 8 and the second laser beam source 9 are emitted to the disc 10 as an information recording medium along substantially the same optical axis C and the reflected light is returned substantially along the aforementioned optical axis, the first laser beam source 8/second laser beam source 9 and the light receiving device substrate 2 can be disposed in the vicinity of each other, so that a compact optical pickup can be formed. For the same reason, the optical system of the optical pickup can be formed so as to excel in compact integration.

Although according to the second embodiment, the first diffraction grating 13 is provided with polarization dependency and the second diffraction grating 14 is provided with wave length dependency, it is permissible to so construct them inversely. That is, like the first embodiment, it is permissible to provide the first diffraction grating 13 with the wave length selectivity by only the depth of unevenness of the surface, so that a light having the wave length of 780 nm is diffracted and a light having the wave length of 650 nm is substantially transmitted through, and provide the second diffraction grating 14 with polarization dependency by forming the optically anisotropic material member according to the region selectivity refractive change so that a linearly polarized light of TE mode is substantially transmitted through and the linearly polarized light of TM mode is diffracted.

Figure 9A:
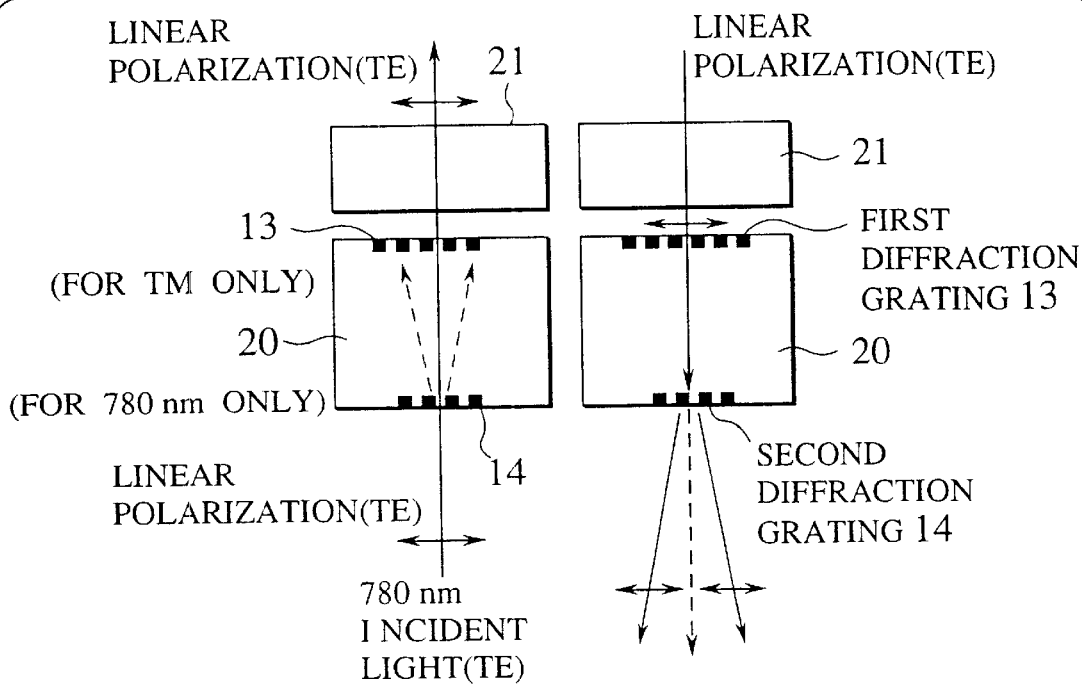
FIGS. 9A, 9B are diagrams showing diffraction and transmission at first and second diffraction gratings of the emission beams of the first and second laser beam sources in the third embodiment of the present invention.
Figure 9B:
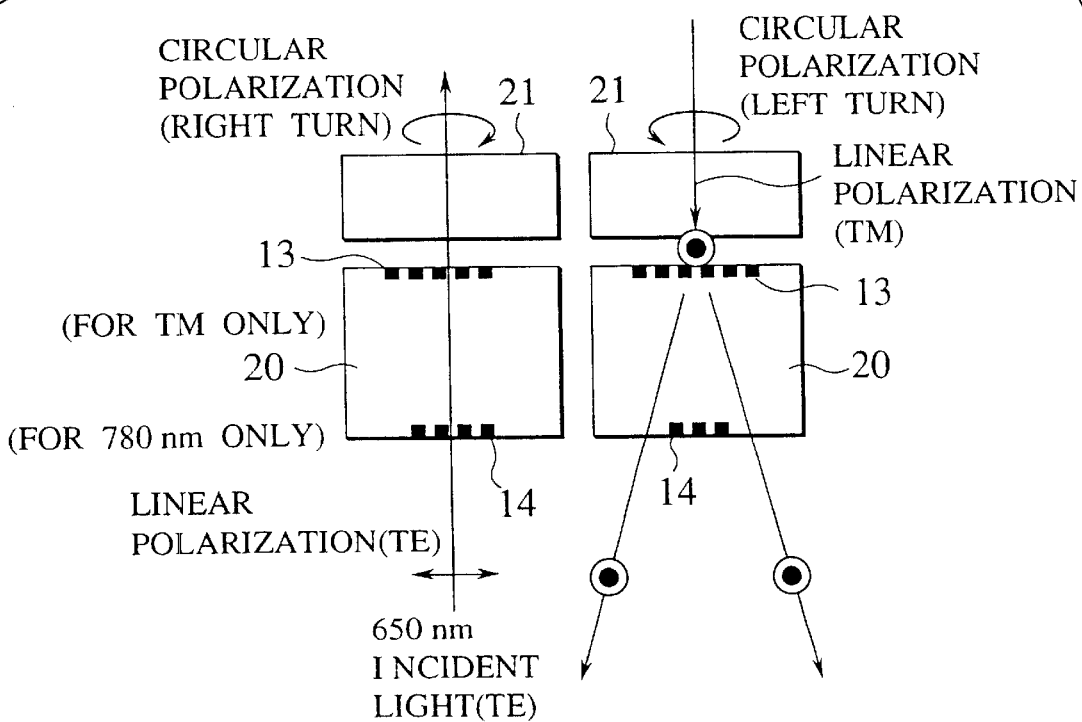

FIGS. 9A, 9B show a third embodiment of the present invention. FIG. 9A is a diagram showing diffraction and transmission of an emission light from the first laser beam source at the first and second diffraction gratings 13, 14. FIG. 9B is a diagram showing diffraction and transmission of an emission light from the second laser beam source at the first and second diffraction gratings 13, 14. In the third embodiment, a description of the same components as the first embodiment is omitted, but only a different structure will be described.

That is, the first laser beam source 8 has the wave length of 780 nm and emits linearly polarized light of TE mode. The second laser beam source 9 has the wave length of 635 nm and emits a linearly polarized light of TE mode which is polarized in the same direction as the first laser beam source 8.

A wave length plate 21 and an optically anisotropic material member 20 are disposed at the same position as the transparent sheet-like member 12 of the first embodiment. As shown in FIGS. 9A, 9B, the wave length plate 21 has wave length dependency, so that a light having the wave length of 780 nm is substantially transmitted through and a light having the wave length of 650 nm is deflected by ¼ wave length. The wave length plate 21 is disposed substantially perpendicular to the aforementioned optical axis C.

A first diffraction grating 13 is formed on a top face of the optically anisotropic material member 20 and a second diffraction grating 14 is formed on a bottom face thereof.

Because the first diffraction grating 13 and the second diffraction grating 14 are the same as the second embodiment, a description thereof is omitted.

The objective lens, wave length plate 21, optically anisotropic material member 20, laser beam source device 5, light receiving device substrate 2 and wiring substrate 1, these components constituting an optical system of the optical pickup, are fixed to the same casing(package) integrally. That is, they are constructed as an optical device for constituting the optical system of the optical pickup.

Next, an operation of the above structure will be described. The optical path of light emitted from the first and second laser beam sources 8, 9 is the same as the first embodiment and different therefrom in an operation of the invention when light passes through the optically anisotropic material member 20 and wave length plate 21 on two ways. That is, referring to FIG. 9A, a beam having a wave length of 780 nm and a linearly polarized light of TE mode, emitted from the first laser beam source is diffracted by the second diffraction grating 14 and the 0-order diffracted light is substantially transmitted through the first diffraction grating 13 and further the wave length plate 21, so that it is introduced to the disc 10 as an information recording medium. A reflected light from the disc 10 is substantially transmitted through both the wave length plate 21 and the diffraction grating 13 and this light is diffracted by the second diffraction grating 14, so that this ±primary-order diffracted light is irradiated to the light receiving device substrate 2.

Referring to FIG. 9B, a beam having the wave length of 650 nm and a linearly polarized light of TE mode, emitted from the second laser beam source 9 is transmitted through the second diffraction grating 14 and the first diffraction grating 13, and this transmitted light is provided with a phase difference of ¼ wave length by the wave length plate 21 so as to be changed to a circularly polarized light of right turn. The circularly polarized light of right turn is introduced to the disc 10. Because the reflected light from the disc 10 is inverted in phase by reflection, this is changed to a circularly polarized light of left turn. The circularly polarized light of left turn is provided with a phase difference by ¼ wave length by the wave length plate 21 so as to be changed to a linearly polarized light of TM mode based on semiconductor laser. Because this TM mode linearly polarized light impinges upon the first diffraction grating 13, it is subjected to diffraction, so that the ±primary-order diffracted light is substantially transmitted through the second diffraction grating 14 and irradiated to the light receiving device substrate 2.

Thus, an emission light from the first laser beam source 8 is substantially transmitted through the first diffraction grating 13 when it passes therethrough, while that light is subjected to diffraction when it passes through the second diffraction grating 14, light usability in an interval between the first laser beam source and the light receiving device substrate is substantially the same as conventionally. An emission light from the second laser beam source is substantially transmitted through the first and second diffraction gratings 13, 14 when they pass therethrough, before that light is introduced to the disc as an information recording medium. When that light is reflected by the disc as an information recording medium and is returned to the light receiving device substrate, it is first diffracted by the first diffraction grating 13. Consequently, light usability in an interval from the second laser beam source to the light receiving device substrate is more excellent than conventionally.

Further, because like the first embodiment, the first laser beam source 8 and the second laser beam source 9 are disposed adjacent to each other, emission lights from the first laser beam source 8 and the second laser beam source 9 are emitted to the disc 10 as an information recording medium along substantially the same optical axis C and the reflected light is returned substantially along the aforementioned optical axis, the first laser beam source 8/second laser beam source 9 and the light receiving device substrate 2 can be disposed in the vicinity of each other, so that a compact optical pickup can be formed. For the same reason, the optical system of the optical pickup can be formed so as to be excellent in compact integration.

Although in the third embodiment, a case in which the first and second laser beam sources 8, 9 are linearly polarized light of TE mode has been described, the present invention can be applied to linearly polarized light of TM mode also because of the same concept. That is, in this case, any one of the first and second diffraction gratings 13, 14 is so constructed as to diffract a linearly polarized light of TE mode.

The third embodiment may be so constructed that the first diffraction grating 13 is provided with wave length selectivity by only the depth of the unevenness of the surface like the first embodiment so that a light having the wave length of 780 nm is diffracted and a light having the wave length of 650 nm is substantially transmitted through and that the second diffraction grating 14 is provided with polarization dependency by forming according to the region selective refractivity change so that a linearly polarized light of TE mode is substantially transmitted through and the linearly polarized light of TM mode is diffracted. In case where the first and second diffraction gratings 13, 14 are constructed in such a manner also, the wave length plate 21 is constructed in the same manner as described above.

Although according to the third embodiment, the wave length plate 21 is so constructed that it allows all light having the wave length of 780 nm to be transmitted through while it provides a light having the wave length of 650 nm with a phase difference of ¼ wave length, it is permissible to so construct that substantially all emission light having a wave length subjected to diffraction by any one of the first diffraction grating 13 and the second diffraction grating 14 is allowed to be transmitted through, while emission light having a wave length transmitted through both the first diffraction grating 13 and the second diffraction grating 14 is provided with a phase difference of ¼ wave length.

In the above respective embodiments, the CD system and CD-R system use a light source having the wave length of 780 nm and of linearly polarized light of TE mode, the DVD system uses a light source having the wave length of 650 nm and of linearly polarized light of TE mode and the DVD-R system uses a light source having the wave length of 635 nm and of a linearly polarized light of TM mode. Therefore, the optical pickup and optical device according to the first and third embodiments can be applied to compatible playback between the CD system/CD-R system and DVD system, and the optical pickup and optical device according to the second embodiment can be applied to compatible playback between the CD system/CD-R system and DVD-R system.

Although in the above respective embodiments, a description thereof is performed assuming that the first and second diffraction gratings 13, 14 are not provided with lens power, it is needless to say that they may be constructed with a hologram device having the diffraction and lens powers.

Although in the above respective embodiments, the first laser beam source 8 and the second laser beam source 9 are formed monolithically on the same chip, they may be formed in a hybrid structure. However, it is favorable to form them monolithically like in the embodiments because two optical axes can be placed sufficiently near each other.

Although in the above respective embodiments, providing the first and second diffraction gratings 13, 14 with wave length dependency is achieved by only the depth of the unevenness of the surface, other method may be used if it is capable of providing with the wave length dependency. However, it is easier to produce by providing with the wave length dependency by only the depth of the unevenness of the surface like the respective embodiments than other methods.

Although in the above respective embodiments, providing the first and second diffraction gratings 13, 14 with polarization dependency is achieved by region selective refractivity change in the optically anisotropic material member, other method may be used if it is capable of providing with polarization dependency.

In the above respective embodiments, the first diffraction grating 13 and the second diffraction grating 14 are formed on top and bottom faces of the transparent sheet-like member 12 or optically anisotropic material member 20, that is, opposing two faces of the same member. This method facilities assembly of this device. Further, it is permissible to form the first diffraction grating 13 and second diffraction grating 14 with different members separately and then bond them together by positioning. This method has an advantage that this device can be produced with a simple production machine.

More generally, it should be understood that many modifications and adaptations of the invention will become apparent to those skilled in the art and it is intended to encompass such obvious modifications and changes in the scope of the claims appended hereto.

What is claimed is:

1. An optical pickup for irradiating light to an information recording medium and reading information by using a reflected light from the information recording medium, the optical pickup comprising:

a first laser beam source having a first wave length;

a second laser beam source having a second wave length;

a first diffraction grating;

a second diffraction grating provided on a face different from a face on which the first diffraction grating is provided; and a light receiving device substrate having four light receiving regions arranged on a straight line on the same plane, the four light receiving regions including a pair of inner receiving regions and a pair of outer receiving regions, a middle point of the pair of inner receiving regions and a middle point of the pair of outer receiving regions coinciding with each other, wherein the first laser beam source and the second laser beam source are disposed in the vicinity of each other, emission lights from the first laser beam source and the second laser beam source are emitted to the information recording medium along the same optical axis which intersects the same plane at the middle point and a reflected light from the information recording medium is returned along the optical axis;

the first diffraction grating, the second diffraction grating and the light receiving device substrate are disposed in order substantially perpendicular to the optical axis;

the first diffraction grating is substantially transparent for any one of the first wave length and the second wave length and diffracts the other wave length to lead the diffracted other wave length onto one pair of the two pairs; and the second diffraction grating is substantially transparent for the other wave length while it diffracts the one wave length to lead the diffracted one wave length onto the other pair.

2. An optical device for use in the optical pickup described in claim 1 wherein the first laser beam source, the second laser beam source, the first diffraction grating, the second diffraction grating and the light receiving device substrate are integrally fixed in the same casing.

3. An optical pickup for irradiating light to an information recording medium and reading information by using a reflected light from the information recording medium, the optical pickup comprising:

a first laser beam source having a first wave length and a linearly polarized light;

a second laser beam source having a second wave length and a linearly polarized light substantially perpendicular to the polarized light of the first laser beam source;

a first diffraction grating;

a second diffraction grating provided on a face different from a face on which the first diffraction grating is provided; and a light receiving device substrate having a plurality of light receiving regions on the same plane, wherein the first laser beam source and the second laser beam source are disposed in the vicinity of each other, emission lights from the first laser beam source and the second laser beam source are emitted to the information recording medium along substantially the same optical axis and a reflected light from the information recording medium is returned along the optical axis;

the first diffraction grating, the second diffraction grating and the light receiving device substrate are disposed in order substantially perpendicular to the optical axis;

any one of the first diffraction grating and the second diffraction grating is substantially transparent for a linearly polarized light of any one of the first laser beam source and the second laser beam source reflected from the information recording medium and diffracts the other linearly polarized light reflected from the information recording medium; and the other one of the first diffraction grating and the second diffraction grating is substantially transparent for a wave length possessed by a laser beam source whose laser beam is diffracted by the first diffraction grating, of the first and second laser beam sources, and diffracts a wave length possessed by a laser beam source whose laser beam substantially is transmitted through the first diffraction grating, of the first and second laser beam sources.

4. An optical device for use in the optical pickup described in claim 3 wherein the first laser beam source, the second laser beam source, the first diffraction grating, the second diffraction grating and the light receiving device substrate are integrally fixed in the same casing.

5. An optical pickup for irradiating light to an information recording medium and reading information by using a reflected light from the information recording medium, the optical pickup comprising:

a first laser beam source having a first wave length and a linearly polarized light;

a second laser beam source having a second wave length and a linearly polarized light substantially the same as the first laser beam source;

a wave length plate;

a first diffraction grating;

a second diffraction grating provided on a face different from a face on which the first diffraction grating is provided; and a light receiving device substrate having a plurality of light receiving regions on the same plane, wherein the first laser beam source and the second laser beam source are disposed in the vicinity of each other, emission lights from the first laser beam source and the second laser beam source are emitted to the information recording medium along substantially the same optical axis and a reflected light from the information recording medium is returned along the optical axis;

the wave length plate, the first diffraction grating, the second diffraction grating and the light receiving device substrate are disposed in order from the information recording medium substantially perpendicular to the optical axis;

any one of the first diffraction grating and the second diffraction grating is substantially transparent for linearly polarized lights of emission lights from the first laser beam source and the second laser beam source and diffracts a linearly polarized light substantially perpendicular to the linearly polarized lights from the first and second diffraction gratings;

the other one of the first diffraction grating and the second grating is substantially transparent for a wave length possessed by a laser beam source whose beam is diffracted by the first diffraction grating, of the first and second laser beam sources and diffracts a wave length possessed by a laser beam source whose beam substantially passes through the first diffraction grating, of the first and second laser beam sources; and the wave length plate provides a wave length of emission light which substantially is transmitted through the first diffraction grating with a phase difference of ¼ wave length.

6. An optical device for use in the optical pickup described in claim 3 wherein the first laser beam source, the second laser beam source, the wave length plate, the first diffraction grating, the second diffraction grating and the light receiving device substrate are integrally fixed in the same casing.

* * * * *

UNITED STATES PATENT AND TRADEMARK OFFICE
CERTIFICATE OF CORRECTION

PATENT NO. : 6,366,548 B1  
DATED : April 2, 2002  
INVENTOR(S) : Minoru Ohyama

Page 1 of 1

It is certified that error appears in the above-identified patent and that said Letters Patent is hereby corrected as shown below:

<u>Column 18,</u>  
Line 18, change "claim 3" to -- claim 5 --.

Signed and Sealed this

Twenty-eighth Day of May, 2002

Attest:

Attesting Officer

JAMES E. ROGAN  
Director of the United States Patent and Trademark Office